INVENTORS.
Clarence R. Steele
Frank B. Price
BY

ATTORNEYS

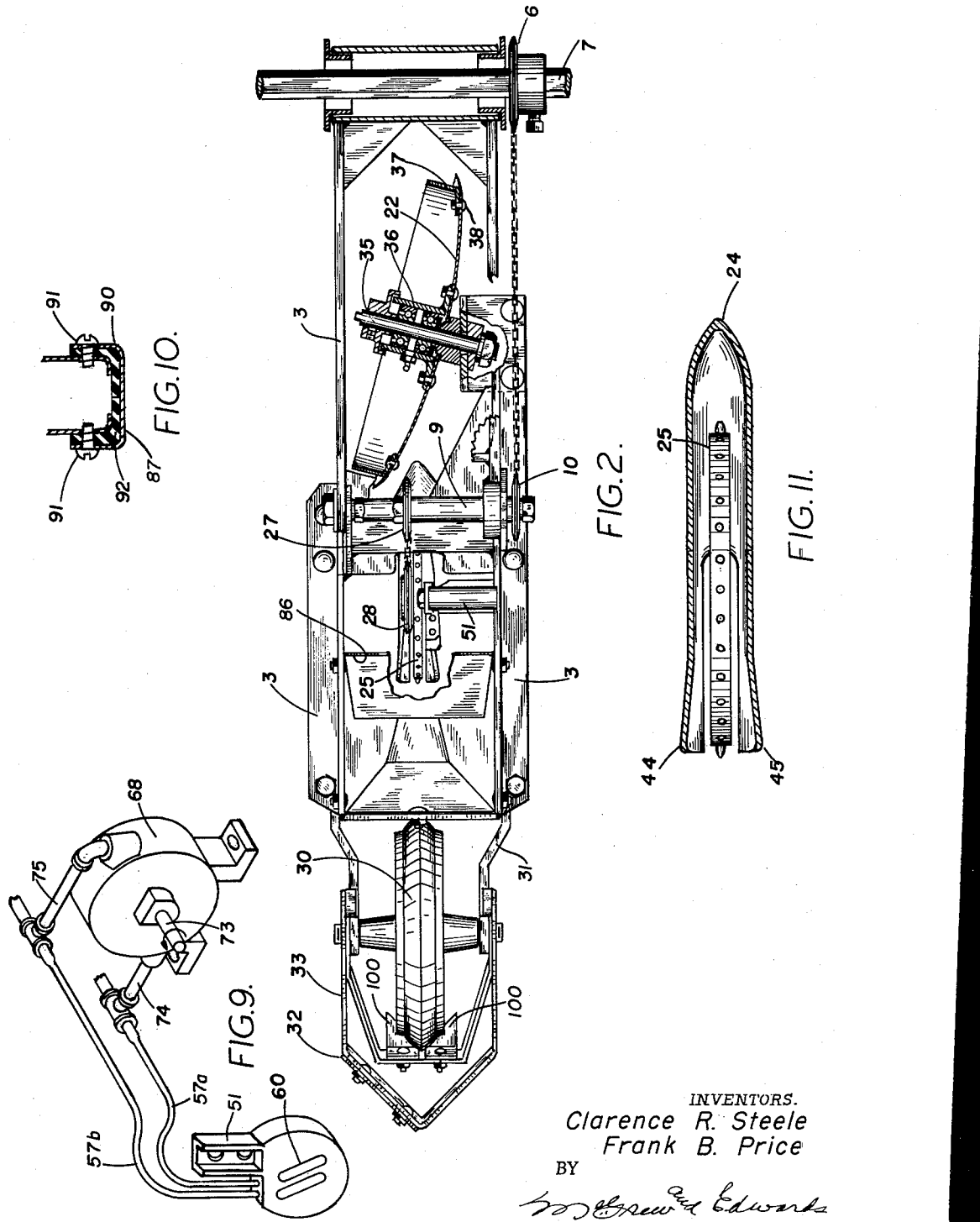

INVENTORS.
Clarence R. Steele
Frank B. Price
BY
ATTORNEYS

United States Patent Office 3,100,462
Patented Aug. 13, 1963

3,100,462
SEED PLANTING APPARATUS
Clarence R. Steele and Frank B. Price, Denver, Colo., assignors to Silver Corporation, Denver, Colo., a corporation of Colorado
Filed Mar. 11, 1959, Ser. No. 798,658
8 Claims. (Cl. 111—77)

This invention relates to agricultural seed planting apparatus, and more particularly to seed planters having a pneumatic seed pick-up assembly for selectively spacing single seeds along a crop furrow and having means for tamping the deposited seeds and covering the same with dirt.

Agricultural research in recent years has substantially increased germination of planted seeds. As the germination of planted seeds has increased, the need for more control of planting has become apparent. Older seeding methods are more or less haphazard in depositing more seed than necessary which not only results in a waste of seed, but, also, increases the cultivation expenses since the overpopulation of plants must be thinned for optimum growing conditions. This is especially true with root crops where the overplanted rows simply do not provide space for optimum growth of the tubers. In all types of agricultural products, however, overpopulation reduces optimum yield since it is virtually impossible to provide sufficient food for the overcrowded plants.

A major object of the present invention is to provide an agricultural seeder for individually planting seeds at selectively spaced intervals along a crop row.

Another object of the invention is to provide a plurality of simplified and effective single seed pick-up assemblies mounted in a series around a wheel whereby to space individual seeds along a crop row.

A further object of the invention is to provide a simplified and effective seed pick-up for a progressive and positive pick-up of single seeds.

A still further object of the invention is to provide a seed pick-up mechanism which is arranged to pass through a seed hopper for a substantial distance of travel to insure a positive, single seed pick-up and provide sufficient time for excess seeds to fall off each single seed pick-up nozzle.

A further object of the invention is to provide a positive discharge mechanism for seeds at a predetermined position in a planting shoe to insure proper spacing of seeds along a crop row.

A further object of the invention is to provide a seed planting mechanism which is arranged to dig a predetermined depth furrow, and to cover seeds deposited in the furrow with a predetermined amount of dirt and tamped to a predetermined pressure.

Figure 1:
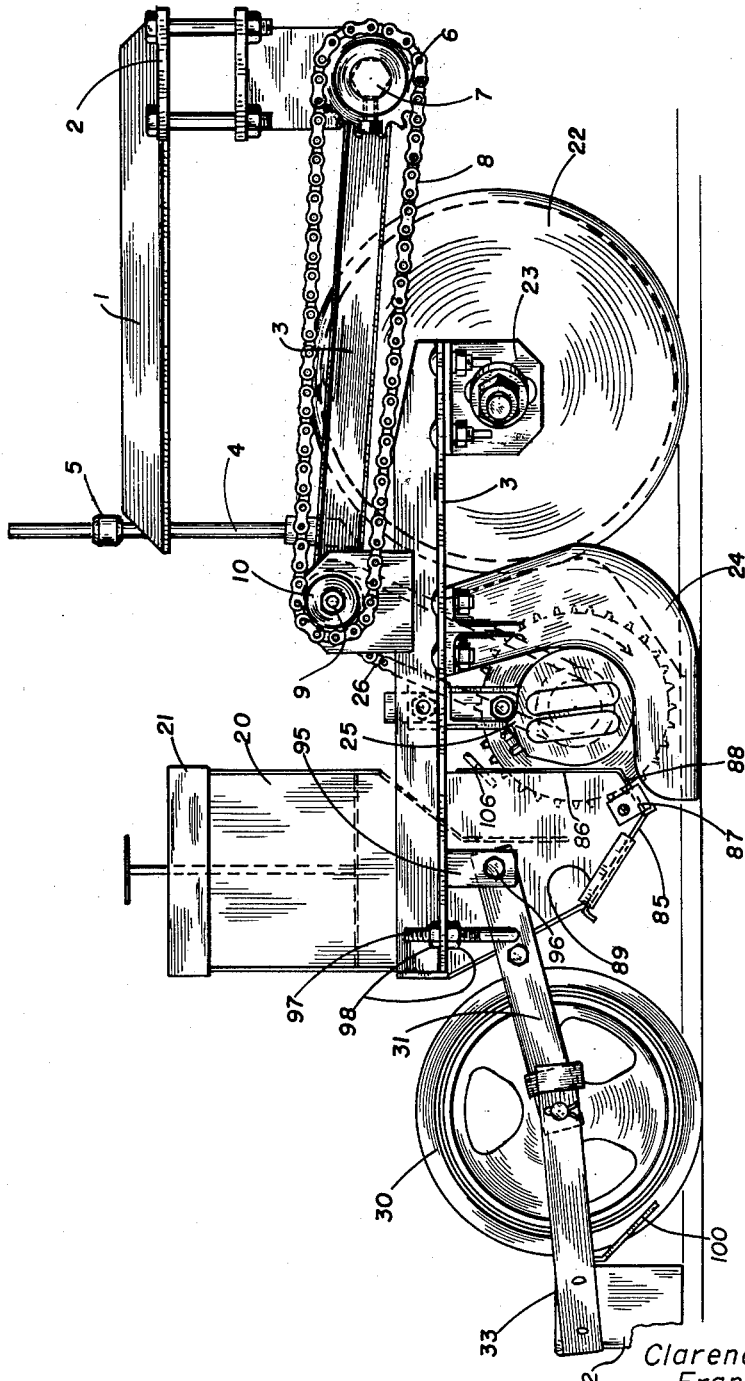
Figure 5:
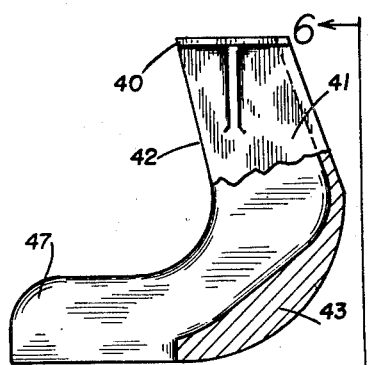
Figure 6:
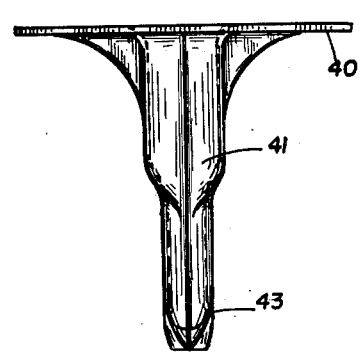
Figure 8:
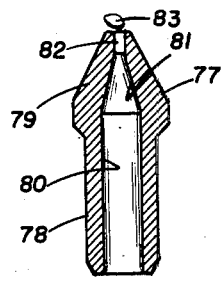
Figure 7:
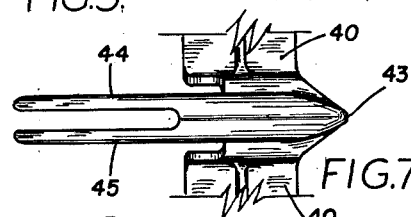
Figures 3, 4:
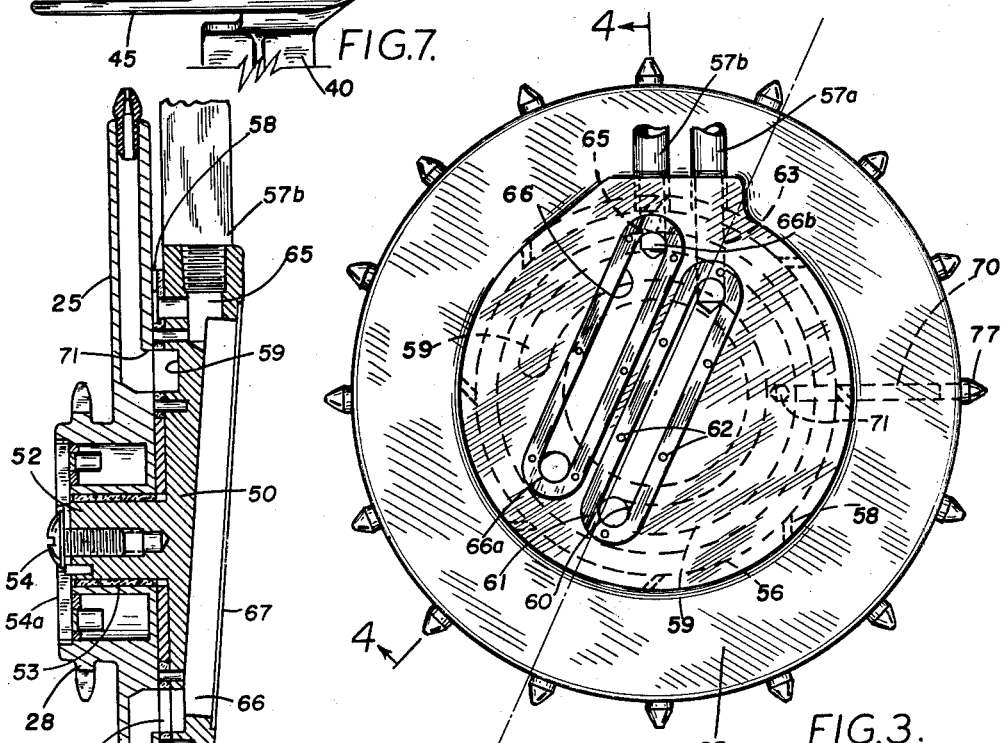

These and other objects and advantages of the invention may be readily ascertained by referring to the following description and appended illustrations in which:

FIG. 1 is a side elevational view of a seeder assembly according to the invention;
FIG. 2 is a top plan view of the assembly of FIG. 1;
FIG. 3 is an enlarged detailed side elevational view of a rotary seed pick-up wheel according to the invention;
FIG. 4 is a front elevational view, in section, of a seed pick-up wheel according to the invention rotated from its normal mounted position which is illustrated in FIG. 1;
FIG. 5 is a side elevational view of a planter shoe according to the invention;
FIG. 6 is a front elevational view of the shoe of FIG. 5;
FIG. 7 is a bottom plan, partial detail of the shoe of FIG. 5;
FIG. 8 is an enlarged, cross sectional detail of a seed pick-up nozzle;
FIG. 9 is a perspective view, partially schematic, of an air pump interconnected to a valve assembly according to the invention;
FIG. 10 is an enlarged, cross sectional detail of a pick-up wheel seal for a seed hopper according to the invention; and
FIG. 11 is a top plan view in partial section of a planting shoe and pick-up wheel according to the invention.

In the device illustrated, a frame 1 includes a clamp assembly 2 arranged for clamping on a frame member of a prime mover. In one application where the device is arranged to plant beet seeds, it may be secured directly to a tractor, a thinning machine or other implement which is attached to a farm tractor. A thinner is generally not an integral part of a tractor, but thinners are frequently used in the beet industry and they make a convenient hitch for the planter. Lower frame members 3 are secured to the frame 1 by means of uprights 4 and movable collars 5 which are arranged to hold the lower frame members prepositioned on the upright 4. A sprocket 6 is secured to a drive rod 7, and a chain 8 is interconnected with sprocket 10 mounted on shaft 9. The drive may be a convenient rod journalled on and driven by a tractor (where the relation may be calibrated to rate of travel) or a drive from a wheel of an agricultural machine as is common practice, which provides a drive in direct relation to travel of the seeder.

A seed hopper 20 having a removable lid 21 covering the charging top is mounted on the rear portion of the frame 3. A depending colter 22 is journalled in a downwardly directed flange 23 at the opposite end of the frame 3. A furrowing shoe 24 is mounted on the frame intermediate the colter and the hopper, and a seed pick-up wheel 25 is rotatably mounted on a bracket suspended below the frame. The seed pick-up wheel is positioned in the shoe and has a portion extending in the seed supply. The pick-up wheel 25 is rotated by means of a chain drive including chain 26 which is driven by a sprocket 27 mounted on shaft 9, FIG. 2, and sprocket 28 mounted on the wheel. The rate of rotation of the seed pick-up wheel in relation to the forward motion of the unit determines the spacing of the seeds, thus seed spacing may be maintained constant at varying planter speeds by maintaining the relative rotation of the wheel with respect to the movement of the planter over the ground. The drive shaft 7 may be of a variable speed so that the relative rotation of the seed pick-up wheel may be varied, or the size of the sprockets may be changed to obtain the desired seed pick-up wheel rotation.

A packing or tamping wheel 30 is mounted on a trailing frame 31 which is pivotally secured to the frame 3 adjacent the seed hopper. A rake member 32, which may be a piece of sheet material, is mounted on a frame extension 33 extending rearwardly from the packing wheel 30. The rake member is disposed angularly to the direction of travel and offset from the shoe so as to rake the furrow mound back into the furrow trench covering the seeds tamped by wheel 30.

The colter 22 is a disc set at an angle to the longitudinal axis of the planter, and is journalled on a shaft 35 mounted in the flange 23. A ballbearing set 36 provides free rotation of the colter on the shaft 35. A cylindrical member 37 is secured to the inner side of the disc colter 22 by means of bolt and nut sets 38 and provides a depth control.

The shoe, shown in detail in FIGS. 5, 6 and 7, includes a mounting plate 40 and a downwardly directed shield 41 having an open rear side 42. The shield extends downwardly in a substantial U-shape cross-section to a furrow plow section 43 at the lower front edge of the shoe. The furrow plow 43 terminates in a rearwardly directed bifurcated section having ends 44 and 45.

The seed planting wheel 25, shown in detail in FIGS. 3 and 4, is a disc-like member mounted on a valve body 50 which is secured on a mount 51. The mount is adjustably secured on the frame to provide a height adjustment for the wheel. A shaft 52 extends outwardly from the valve body 50 and rotatably supports the seed pick-up wheel 25.

The pick-up wheel 25 includes a series of radial passages 70 (only one being shown in FIG. 3 for clarity) terminating at the periphery of the wheel. A nozzle 77 is inserted in each of the passages 70. This nozzle provides means for the single seed pick-up. The nozzle is illustrated in detail in FIG. 8, and it includes a shank 78 for seating in passage 70 and a head 79. A bore 80 extends through the shank portion at a full diameter, and is necked down at 81 in the head portion to a small outlet passage 82. The passage 82 is substantially smaller than the average diameter of a seed 83, which may be held on the nozzle by virtue of the suction from the pump. In one application for sugar beet seeds, the truncated conical head of the nozzle 77 has its conical surface diverging at about 62°, and the passage 82 is about 0.033 inch. Also, the diameter of the tip of the nozzle is about 1/16 of an inch which prevents a build up of such seeds on the tip of the nozzle under the influence of the suction from the pump. For different seeds these dimensions may be changed.

A sleeve bearing 53 provides a bearing surface between the wheel and the shaft. The wheel is secured to the valve body by means of a bolt 54 and cover 54a rotatably holding the wheel. A drive sprocket 28 which may be integrally secured to the wheel 25 and a chain 26, as explained above, rotates the wheel 25. An annular bearing surface 55 of nylon or other suitable material is secured on the face of the valve body 50 to provide a bearing surface for the wheel 25, and rotatably seals the wheel to the valve body.

A small, shallow annular groove 56 extending around the anular bearing 55 provides blow-back air manifold from an air inlet 65 through a series of diagonal outlets 58 spaced around the periphery of the annular seal 55. These outlets provide a continuous bleed of air for keeping the wheel free from clinging seeds and dirt.

A shallow groove 59 is milled in the annular seal 55 and partially into valve body 50, and this groove extends about 300° around the seal. This groove communicates with a slot 60 in the valve body 50. The slot 60 in interconnected with a suction line 57a. A shallow slot 61 around the slot 60 provides means for securing a seal and cover thereto. Tapped holes 62 provide means for securing such a cover 67 to the valve body. The line 57a communicates through passage 63 with the slot 60. Blow-back air is introduced into the device through line 57b interconnected with passage 65 which communicates with slot 66. A bore 66a in the lower end of the slot 66 provides a blow-back air communication for each seed pick-up nozzle as its passage end 71 passes the bore 66a. The inner end or bore 71 of each passage 70 terminates in position to communicate with groove 59 for applying suction to each nozzle for a major arc of revolution. Cleaning air discharges continuously into groove 56 through bore 66b at the upper end of slot 66. The slot 59 extends about 300° around the valve so a seed picked up from the trough is carried around, clockwise in FIG. 1, and dropped at about the closest point to the ground.

A light, short duration stream of air from an air jet 106 directed across each nozzle as it emerges from the seeds and while still in the trough prevents two seeds from being held on a nozzle. The first seed on the nozzle is tightly held by suction while the second is only lightly held, so the short duration of light blow insures proper single seed pick-up.

An air pump 68 is mounted on the frame (not shown in mounted position) and is driven either by an auxiliary engine, not shown, or by a convenient drive arrangement connected through a driving means, such as drive rod 7 or shaft 9, interconnected with pump shaft 73. An inlet 74 is connected to the suction tube 57a of the planter, and an outlet 75 is connected to the blow-back tube 57b. The air jet 106 may be connected (not shown) to the blow-back air manifold. A single pump may be utilized to operate several seeders, and the lines may thus be extended to the seeders pulled by a single tractor.

The pick-up wheel is mounted so that a portion of the wheel is in seed trough 85 mounted below and in communication with the seed hopper 20. The trough includes a bifurcated front wall 86 through which the wheel 25 passes, and a lower seal 87 for the nozzles which prevents the seeds from falling out of the trough from the spaces between the nozzles. The lower wall 88 of the seed trough is mounted below a horizontal plane passing through the wheel axis of rotation and forwardly of a vertical plane passing through the same axis which provides a nozzle rotation of about 60° in the trough before it emerges. This travel in addition to the light stream of air, machine vibration and bouncing shakes off extraneous seeds clinging to a nozzle or the wheel, and the seeds fall back into the trough.

The seed trough seal, shown in detail in FIG. 10, includes a U-shaped clip 90 secured by means of screws 91 to the hopper wall 88 adjacent the bottom of the bifurcated front wall 86. A resilient seal 92 is mounted in the U-shaped member and its front portion is slit to permit passage of the nozzles of the pick-up wheel and to seal the spaces therebetween as they rotate into the seed trough. A trap door 89 in the bottom of the seed trough provides a clean out for the trough.

The trailing frame 31 is pivotally mounted in a flange 95 by means of bolt and nut assembly 96, and is adjustably secured to the frame 3 by means of a bolt 97 and nuts 98. The vertical adjustment of the trailing frame 31 by means of the bolt 97 determines the planting depth of the seeds in the furrow. A scraper 100 prevents a build up of mud on the roller 30.

In operation the device is secured to a prime mover with the various drives mounted so as to provide a rotation of the pick-up wheel 25 which will space the seeds as required along the furrow. As the prime mover pulls the planter along the row, the colter 22 cuts a furrow trench along the prospective crop row. The pick-up wheel 25 rotates in the same direction as the tractor wheels and upwardly through the seal 92 into seed trough 85. Immediately prior to each nozzle's contact with the seal, the nozzle passage end 71 passes blow-back bore 66a cleaning any dirt from the passage and nozzle. Suction on each nozzle passage is started as its end 71 communicates with slot 59, just as the nozzle enters the trough. As explained, the suction on each nozzle continues through the seed hopper around approximately 300° of rotation from the start. During its passage through the seed trough, each nozzle picks up one seed, carrying it out of the trough around to approximately the vertical plane through the axis of the pick-up wheel which is substantially the lowest point on the pick-up wheel. At this point the nozzle passage is beyond the suction slot 59, and the seed drops off into the furrow formed by the shoe. The shoe travels in the furrow trench spreading the dirt and maintaining desired trench depth. The following tamping wheel 30 presses each seed into the furrow trench, and the rake 32 drags dirt back into the furrow covering the tamped seeds. To keep the pick-up wheel clean, the blow-back air may be introduced into the shallow groove around the annular bearing and the small outlets 58 blow dirt and trash from the pick-up wheel.

Under normal farming operations, a series of the seeders are connected side-by-side so as to plant a plurality of rows at one time. The suction pump should, of course, have sufficient capacity to provide the suction necessary for the seed pick-up for all of the pick-up wheels, which prevents duplication of expensive parts. Where necessary, a portion of the exhaust system from the air pump may be returned to the blow-back, and the cleaning system, or a separate pressure system, may be used.

While the invention has been illustrated by reference to a specific embodiment, there is no intent to limit the scope or spirit of the invention to the precise details so set forth, except insofar as defined in the following claims.

We claim:

1. In a mobile seed planter for row planting, the combination of an upper source of seed supply, a lower seed discharge mechanism and an intermediate seed transport system, a suction pickup member having a series of outwardly extending pneumatic pickup nozzles spaced at uniform intervals and movable through a passage in the seed supply, each nozzle having a tapering end and a passage therein of less diameter than a single seed, whereby only a single seed is attached during movement through said seed supply, means for moving said nozzles at a uniform rate through the seed supply passage and intermediate system for discharge in the row at approximately ground level, said intermediate transport system including shielding means forwardly of and at the sides of said nozzles, with the nozzles extending close to the bottom of the shielding means for preventing wind scattering of attached and discharging seeds, and a discharge control associated with said nozzles for terminating suction and directing discharge forces through each nozzle at its nearest point to ground contact, whereby the released seeds are discharged vertically and deposited singly at uniform intervals in the row.

2. In a mobile seed planter for row planting, the combination of an upper source of seed supply, a lower seed discharge mechanism and an intermediate seed transport system, a suction pickup member having a series of outwardly extending pneumatic pickup nozzles spaced at uniform intervals and movable through a passage in the seed supply, each nozzle having a tapering end and a passage therein of less diameter than a single seed, means in the hopper, and operative while the suction on the suction pickup member is effective, for removing excess seeds not covering the nozzle passages, whereby only a single seed is attached during movement through said seed supply, means for moving said nozzles at a uniform rate through the seed supply passage and intermediate system for discharge in the row at approximately ground level, said intermediate transport system including shielding means forwardly of and at the sides of said nozzles, with the nozzles extending close to the bottom of the shielding means for preventing wind scattering of attached and discharging seeds, and a discharge control associated with said nozzles for terminating suction and directing discharge forces through each nozzle at its nearest point to ground contact, whereby the released seeds are discharged vertically and deposited singly at uniform intervals in the row.

3. In a mobile seed planter for row planting, a distributor wheel having a plurality of pneumatic, seed-pickup nozzles extending outwardly from its periphery and having the nozzle passage of less diameter than a single seed, a seed-containing hopper on said planter having a passage through which a segment of said wheel is passing while the wheel is rotating, drive means on the planter for rotating said wheel with its nozzles moving upwardly through said passage in the hopper, a bifurcated, ground-contacting member carried by the planter and defining a passage through which another segment of the wheel is passing during the wheel rotation, the lowest position of the nozzle being within the bifurcated member and substantially at the bottom thereof, a pneumatic system, including valves associated with said wheel, for maintaining suction on said nozzles during their rotation through said hopper in a seed pickup action and until they assume a substantially vertical position within the bifurcated enclosure, means in said valves arranged to terminate suction through said nozzles in the downward vertical position so as to release and discharge the seeds vertically at the level of the top of a furrow and in substantially uniform spacing in the row while shielded from air movements by the bifurcated member, and another ground-contacting member secured to the planter and disposed rearwardly of the bifurcated member for covering said seeds immediately after their deposit in the row.

4. In a mobile seed planter for row planting, a distributor wheel having a plurality of pneumatic, seed-pickup nozzles extending outwardly from its periphery and having the nozzle passage of less diameter than a single seed, a seed-containing hopper on said planter having a passage through which a segment of said wheel is passing while the wheel is rotating, drive means on the planter for rotating said wheel with its nozzles moving upwardly through said passage in the hopper, means in the hopper for removing more than a single seed from each nozzle, a bifurcated, ground-contacting member carried by the planter and defining a passage through which another segment of the wheel is passing during the wheel rotation, the lowest position of the nozzle being within the bifurcated member and substantially at the bottom thereof, a pneumatic system, including valves associated with said wheel, for maintaining suction on said nozzles during their rotation through said hopper in a seed pickup action, while the means for removing more than a single seed is operating, and until they assume a substantially vertical position within the bifurcated enclosure, means in said valves arranged to terminate suction through said nozzles in the downward vertical position so as to release and discharge the seeds vertically at the level of the top of a furrow and in substantially uniform spacing in the row while shielded from air movements by the bifurcated member, and another ground-contacting member secured to the planter and disposed rearwardly of the bifurcated member for covering said seeds immediately after their deposit in the row.

5. In a mobile seed planter for row planting, a distributor wheel having a plurality of pneumatic, seed-pickup nozzles extending outwardly from its periphery and having the nozzle passage of less diameter than a single seed, a seed-containing hopper on said planter having a passage through which a segment of said wheel is passing while the wheel is rotating, drive means on the planter for rotating said wheel with its nozzles moving upwardly through said passage in the hopper, a bifurcated, ground-contacting member carried by the planter and defining a passage through which another segment of the wheel is passing during the wheel rotation, the lowest position of the nozzle being within the bifurcated member and substantially at the bottom thereof, a pneumatic system, including valves associated with said wheel, for maintaining suction on said nozzles during their rotation through said hopper in a seed pickup action and until they assume a substantially vertical position within the bifurcated enclosure, means in said valves arranged to terminate suction through said nozzles in the downward vertical position so as to release and discharge the seeds vertically at the level of the top of a furrow and in substantially uniform spacing in the row while shielded from air movements by the bifurcated member, said valves being arranged to direct a blow-back flow through the nozzles after seed discharge and before re-entry into the hopper passage for removal of foreign matter from the nozzle passage, and another ground-contacting member secured to the planter and disposed rearwardly of the bifurcated member for covering said seeds immediately after their deposit in the row.

6. In a mobile seed planter for row planting, a distributor wheel having a plurality of pneumatic, seed-pickup nozzles extending outwardly from its periphery and having the nozzle passage of less diameter than a single seed, a seed-containing hopper on said planter having a passage through which a segment of said wheel is passing while the wheel is rotating, drive means on the planter for rotating said wheel with its nozzles moving upwardly through said passage in the hopper, a bifurcated, ground-contacting member having upstanding sides carried by the planter and defining a passage through which another segment of the wheel is passing during the wheel rotation, the lowest position of the nozzle being within the bifurcated member and substantially at the bottom thereof, a pneumatic system, including valves associated with said wheel, for maintaining suction on said nozzles during their rotation through said hopper in a seed pickup action and until they assume a substantially vertical position within the bifurcated enclosure, means in said valves arranged to terminate suction through said nozzles in the downward vertical position so as to release and discharge the seeds vertically at the level of the top of a furrow and in substantially uniform spacing in the row while shielded from air movements by the bifurcated member, and another ground-contacting member secured to the planter and disposed rearwardly of the bifurcated member for covering said seeds immediately after their deposit in the row.

7. In a mobile seed planter for row planting, a distributor wheel having a plurality of pneumatic, seed-pickup nozzles extending outwardly from its periphery and having the nozzle passage of less diameter than a single seed, a seed-containing hopper on said planter having a passage through which a segment of said wheel is passing while the wheel is rotating, drive means on the planter for rotating said wheel with its nozzles moving upwardly through said passage in the hopper, said wheel being mounted for rotation on a valve block on the planter in pressure-sealed relation thereto, an arcuate suction groove in the block disposed in register with the inner ends of said nozzle passages through approximately 300° of their rotation, a bifurcated, ground-contacting member carried by the planter and defining a passage through which another segment of the wheel is passing during the wheel rotation, the lowest position of the nozzle being within the bifurcated member and substantially at the bottom thereof, a pneumatic system, including valves associated with said wheel and said block, for maintaining suction on said nozzles during their rotation through said hopper in a seed pickup action and until they assume a substantially vertical position within the bifurcated enclosure, means in said valves arranged to terminate suction through said nozzles in the downward vertical position so as to release and discharge the seeds vertically at the level of the top of a furrow and in substantially uniform spacing in the row while shielded from air movements by the bifurcated member, and another ground-contacting member secured to the planter and disposed rearwardly of the bifurcated member for covering said seeds immediately after their deposit in the row.

8. In a mobile seed planter for row planting, a distributor wheel having a plurality of pneumatic, seed-pickup nozzles extending outwardly from its periphery and having the nozzle passage of less diameter than a single seed, a seed-containing hopper on said planter having a passage through which a segment of said wheel is passing while the wheel is rotating, drive means on the planter for rotating said wheel with its nozzles moving upwardly through said passage in the hopper, said wheel being mounted for rotation on a valve block on the planter in pressure-sealed relation thereto, an arcuate suction groove in the block disposed in register with the inner ends of said nozzle passages through approximately 300° of their rotation, a bifurcated, ground-contacting member carried by the planter and defining a passage through which another segment of the wheel is passing during the wheel rotation, the lowest position of the nozzle being within the bifurcated member and substantially at the bottom thereof a pneumatic system, including valves associated with said wheel and said block, for maintaining suction on said nozzles during their rotation through said hopper in a seed pickup action and until they assume a substantially vertical position within the bifurcated enclosure, means in said valves arranged to terminate suction through said nozzles in the downward vertical position so as to release and discharge the seeds vertically at the level of the top of a furrow and in substantially uniform spacing in the row while shielded from air movements by the bifurcated member, means for directing a blow-back flow through said nozzles when they move out of communication with said groove for forceful discharge of the single seed covering each nozzle passage, and another ground-contacting member secured to the planter and disposed rearwardly of the bifurcated member for covering said seeds immediately after their deposit in the row.

References Cited in the file of this patent

UNITED STATES PATENTS

| | | |
|---|---|---|
| 634,914 | Sayre | Oct. 17, 1899 |
| 744,984 | Springer | Nov. 24, 1903 |
| 1,637,834 | Oliver | Aug. 2, 1927 |
| 2,325,665 | Cox | Aug. 3, 1943 |
| 2,455,701 | Putman | Dec. 7, 1948 |
| 2,605,017 | Bolen | July 29, 1952 |
| 2,605,023 | Ward | July 29, 1952 |
| 2,649,725 | Oehler | Aug. 25, 1953 |
| 2,667,286 | Raught | Jan. 26, 1954 |
| 2,732,975 | Balzer | Jan. 31, 1956 |
| 2,855,125 | Grimsbo | Oct. 7, 1958 |
| 2,871,805 | Behnen | Feb. 3, 1959 |
| 2,980,043 | Beck | Apr. 18, 1961 |
| 2,986,305 | Koerper | May 30, 1961 |

FOREIGN PATENTS

| | | |
|---|---|---|
| 67,776 | Denmark | Sept. 27, 1948 |
| 1,172,441 | France | Oct. 13, 1958 |
| 734,730 | Great Britain | Aug. 3, 1955 |